(12) United States Patent
Upadhyaya

(10) Patent No.: US 11,360,778 B2
(45) Date of Patent: Jun. 14, 2022

(54) DYNAMIC INSIGHTS EXTRACTION AND TREND PREDICTION

(71) Applicant: Oracle International Corporation, Redwood Shores, CA (US)

(72) Inventor: Anadi Upadhyaya, San Ramon, CA (US)

(73) Assignee: Oracle International Corporation, Redwood Shores, CA (US)

(*) Notice: Subject to any disclaimer, the term of this patent is extended or adjusted under 35 U.S.C. 154(b) by 50 days.

(21) Appl. No.: 16/711,226

(22) Filed: Dec. 11, 2019

(65) Prior Publication Data

US 2021/0182069 A1 Jun. 17, 2021

(51) Int. Cl.
| | | |
|---|---|---|
| *G06F 9/46* | (2006.01) | |
| *G06F 9/38* | (2018.01) | |
| *G06F 11/34* | (2006.01) | |
| *G06F 9/48* | (2006.01) | |

(52) U.S. Cl.
CPC .......... *G06F 9/3851* (2013.01); *G06F 9/4843* (2013.01); *G06F 11/3452* (2013.01)

(58) Field of Classification Search
CPC ... G06F 9/3851; G06F 9/4843; G06F 11/3452
See application file for complete search history.

(56) References Cited

U.S. PATENT DOCUMENTS

| | | | | |
|---|---|---|---|---|
| 8,352,956 | B1* | 1/2013 | Kishore | G06F 11/3419 718/106 |
| 9,990,630 | B2* | 6/2018 | Siracusa | H04L 67/2809 |
| 10,560,662 | B1* | 2/2020 | Tippana | H04L 51/046 |
| 2007/0094281 | A1* | 4/2007 | Malloy | G06Q 10/06 |
| 2008/0140246 | A1* | 6/2008 | Kang | G05B 19/41815 700/109 |
| 2013/0145369 | A1* | 6/2013 | Biberstein | G06F 11/3466 718/100 |
| 2015/0310401 | A1* | 10/2015 | Siracusa | G06F 11/3495 705/39 |
| 2016/0337200 | A1* | 11/2016 | Wei | H04L 41/145 |
| 2019/0102425 | A1* | 4/2019 | Obeidat | G06F 16/252 |

* cited by examiner

*Primary Examiner* — Camquy Truong
(74) *Attorney, Agent, or Firm* — Invoke

(57) ABSTRACT

Techniques for process execution trend prediction and visualization are disclosed. The disclosed system receives a process execution request to be executed on a set of targets. The request may include request characteristics, such as a request type and computations to be performed during execution. The system analyzes the request characteristics to determine the computations to execute and for initiates request execution on the targets. Based on the analysis, the system generates predictions regarding the execution, including an estimated completion time. During execution, the system displays various attributes of the execution in a dynamically updating visualization. The system also provides real-time recommendations on how the process can be optimized, such as to reduce execution time and errors.

20 Claims, 10 Drawing Sheets

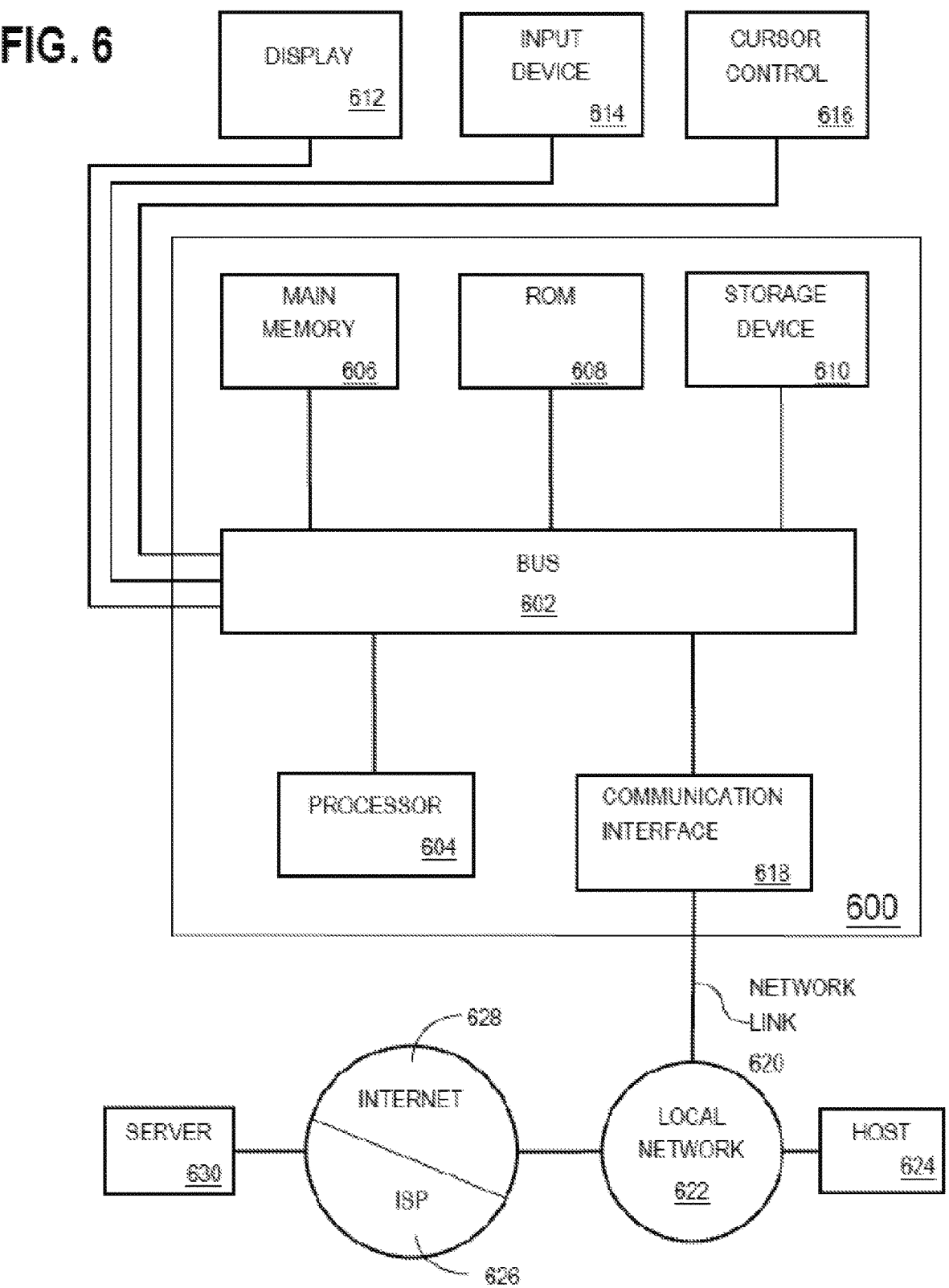

DYNAMIC INSIGHTS EXTRACTION AND TREND PREDICTION

TECHNICAL FIELD

The present disclosure relates to making trend predictions associated with the executions of computer program processes.

BACKGROUND

Large organizations are often required to perform complex operations that rely on computer software-based processes. These computer processes can be executed occasionally or on a scheduled basis. For example, an organization may wish to update its databases in response to a change in the business. The database change may impact billions of data items. Users may execute these large-scale computer operations executed on distributed computing systems involving multiple computers executing processes in tandem so as to actualize the required change. Many processes require exclusive access to resources during execution. Some of these computer processes may require extensive configuration by users. These computer processes may execute over extended lengths of time. During execution, users may need to wait for process completion to determine whether the process executed successfully, what portions of the process were most resource-intensive, and what portions could be optimized for speed, efficiency, security, or predictability.

During process execution, large-scale data changes may occur. As the process progresses, it may be difficult to track trends reflected by the data updates that are occurring. It may cumbersome or impossible to determine when the process will complete. Moreover, previous process executions may not be available for comparison or to provide a useful measure of how the process executes and for how long.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings:

FIG. 6 shows a block diagram that illustrates a computer system in accordance with one or more embodiments.

DETAILED DESCRIPTION

Figure 1A:
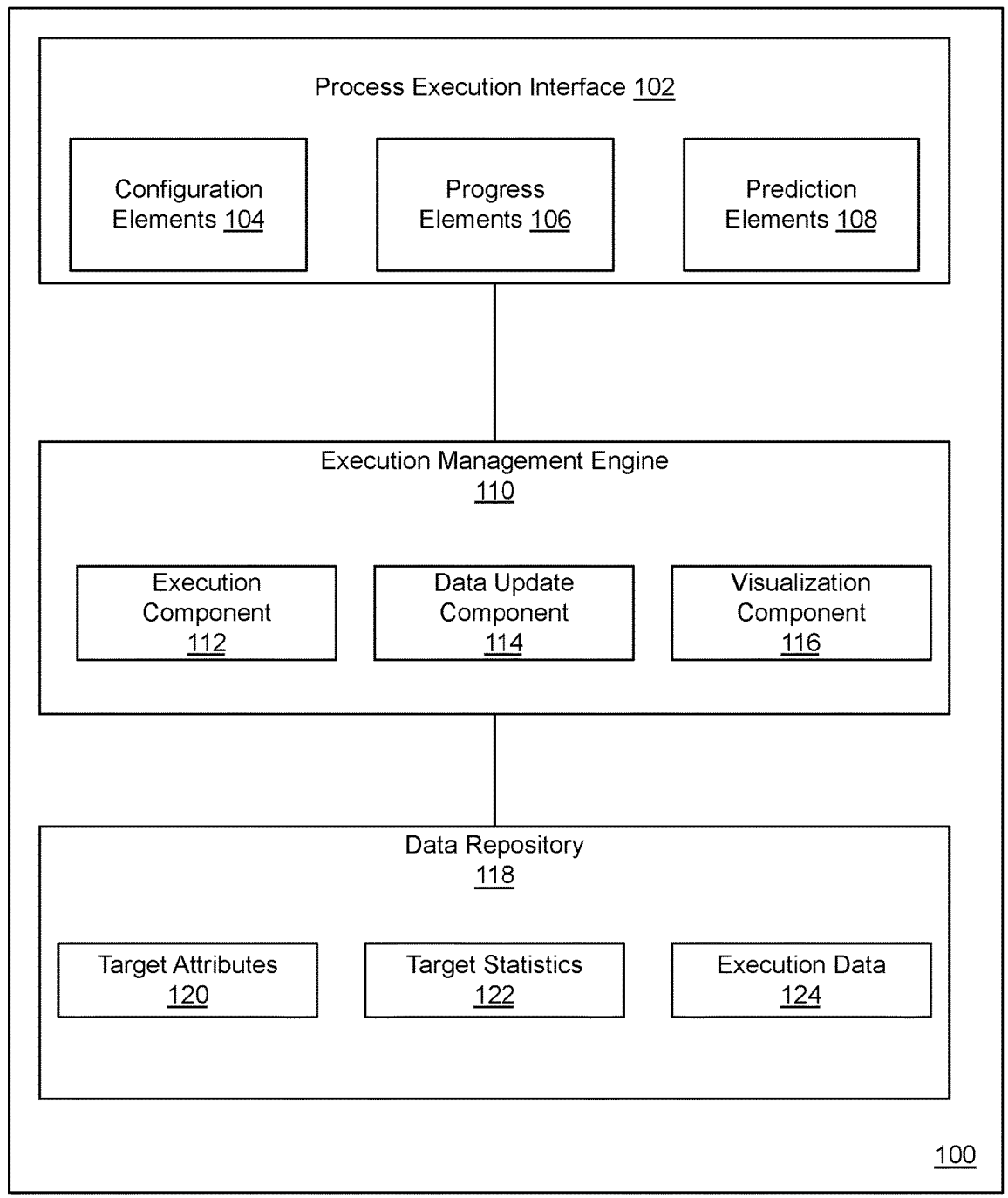
FIGS. 1A-1D illustrate a system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. PROCESS EXECUTION TREND PREDICTION AND VISUALIZATION
4. ILLUSTRATIVE EXAMPLE
5. MISCELLANEOUS; EXTENSIONS
6. HARDWARE OVERVIEW
7. COMPUTER NETWORKS AND CLOUD NETWORKS
8. MICROSERVICE APPLICATIONS

1. General Overview

One or more embodiments visualize information and provide recommendations corresponding to a request currently being executed against a set of targets. In an example, the system may execute a request to compute the bonus for each of the thousands of employees of a large corporation. The execution of the request involves executing different types of computations. Examples of types of computations include (a) preset computations configured by a software developer, and (b) custom computations defined by end-users that purchased or licensed the software. Executing a request on a set of targets may include executing any particular type of computation thousands of times. As a result, execution of the request as a whole may require hours or days to complete. Given the long duration for executing the request, information about the currently executing request and recommendations to optimize or otherwise improve the currently executing request are especially useful.

The system visualizes statistics or trends corresponding to the execution of the request as the request is being executed. Examples of statistics or trends corresponding to a particular type of computation may include, but are not limited to: the number of threads executing computations of the particular type, a number of executions of the particular type that have already been completed, a number of executions of the particular type that have to still be completed, an estimated amount of time for executing computations of the particular type. Examples of statistics or trends corresponding to the request as a whole may include, but are not limited to, a predicted total amount of time for completing the request, a predicted remaining amount of time for completing the request, and a predicted average amount of time for completing the request for a single target of the set of targets.

One or more embodiments generate recommendations to modify the execution parameters while the request is being executed. In an example, the system generates recommendations in relation to a particular type of computation. The system may identify a type of computation to be optimized, reconfigured, or removed altogether. The system may recommend adding threads to a set of threads designated for executing a particular type of computation.

One or more embodiments described in this Specification and/or recited in the claims may not be included in this General Overview section.

2. Architectural Overview

FIGS. 1A-1D illustrate a system for process execution trend prediction and visualization in some embodiments. FIG. 1A illustrates a system 100 in accordance with one or more embodiments. As illustrated in FIG. 1, system 100 includes a process execution interface 102, an execution management engine 110, a data repository 118, and various components thereof. In one or more embodiments, the system 100 may include more or fewer components than the components illustrated in FIG. 1. The components illustrated in FIG. 1 may be local to or remote from each other. The components illustrated in FIG. 1 may be implemented in software and/or hardware. Each component may be distributed over multiple applications and/or machines. Multiple components may be combined into one application and/or machine. Operations described with respect to one component may instead be performed by another component. Additional embodiments and/or examples relating to computer networks are described below.

In an embodiment, process execution interface 102 refers to hardware and/or software configured to facilitate communications between a user (e.g., a user executing a process in response to a request or observing the execution of a process) and system 100. Process execution interface 102 renders user interface elements and receives input via user interface elements. Examples of interfaces include a graphical user interface (GUI), a command line interface (CLI), a haptic interface, and a voice command interface. Examples of user interface elements include checkboxes, radio buttons, dropdown lists, list boxes, buttons, toggles, text fields, date and time selectors, command lines, sliders, pages, and forms.

In an embodiment, different components of process execution interface 102 are specified in different languages. The behavior of user interface elements is specified in a dynamic programming language, such as JavaScript. The content of user interface elements is specified in a markup language, such as hypertext markup language (HTML) or XML User Interface Language (XUL). The layout of user interface elements is specified in a style sheet language, such as Cascading Style Sheets (CSS). Alternatively, process execution interface 102 is specified in one or more other languages, such as Java, C, or C++.

In an embodiment, process execution interface 102 may include various types of interface elements that the above-mentioned user may interact with. For example, process execution interface 102 can include configuration elements 104, progress elements 106, and prediction elements 108.

In an embodiment, configuration elements 104 include user interface elements that the user can interact with to configure the request or the process to be executed as per the request. For example, the user can use configuration elements 104 to include particular types of computations as part of the process to be executed. More details regarding configuration elements 104 are described below with respect to FIG. 1B.

Progress elements 106 can include user interface elements that can present, to the user, one or more attributes or characteristics of the process execution. For example, progress elements 106 can include a currently elapsed time for the process execution and/or a remaining time for the process execution to be completed. More details regarding progress elements 106 are described below with respect to FIG. 1C.

Prediction elements 108 can include one or more user interface elements that provide forecasts or predictions with respect to the process execution. These predictions can be provided before or during a process execution. For example, prediction elements 108 can include a predicted execution time, a predicted success probability, or the like. More details regarding prediction elements 108 are described below with respect to FIG. 1D.

In an embodiment, a process execution request refers to a request by a user, organization, or computer system to run a particular process on one or more target data points. For example, an organization may wish to update human resource data for one or more employees of the organization. As a more specific example, the organization may wish to update the organizational structure of the employees such that, as a result, a large number of employees are within a new organizational group or have a different supervisor or reporting hierarchy. As another example, the compensation of certain employees may need to be updated in terms of compensation amount, compensation structure, compensation currency, or the like. As mentioned above, processes that enact these changes may act on large numbers of targets in cases where the organization includes many employees. Such process executions may be a frequent occurrence throughout the year. Additionally or alternatively, such process executions may occur only at designated times of the year, such as during a benefits enrollment period. Accordingly, the processes may be executed at sensitive times where it is critical to have predictability regarding the process's execution, such as knowledge of how long a process execution may take and the probability that the process will complete successfully.

In an embodiment, execution interface 102 can be configured to display an execution of a process, including dynamically updating the status of various characteristics of the process as it executes. For example, execution interface 102 may display a number of targets that have currently been processed. As more targets are processed, execution interface 102 may update a display of the number of processed targets in real time. Similarly, execution interface 102 may display the remaining number of targets as a statistic that is updated in real time.

In an embodiment, system 100 can include execution management engine 110. Execution management engine 110 may be configured to perform process executions in response to requests such as those described above. Execution management engine 110 may be configured to cause execution interface 102 to present dynamically updating process executions. Execution management engine 110 may also be configured to update data in data repository 118 as the process is executed.

In an embodiment, a process execution may include one or more computations of different types. For example, a process execution may involve determining a compensation value for an employee. However, the employee may live in a country where the currency differs from the currency of the country where the compensation decision originated. In other words, the employee's compensation structure may need to be converted into the relevant currency for the employee before the compensation structure can be applied.

In an embodiment, the computations associated with a request may be of different types. Certain computations may be preset, built-in, or otherwise preconfigured into system 100. For example, system 100 may enable a user to select certain preset computations that perform predictable functions (e.g., basic mathematical calculations). Computations may also be created by a user of system 100. For example, the user may create various custom algorithms, software routines, calculations, heuristics, or models that can be executed on target data sets to achieve a certain result. These user-generated computations may cause updates to the data. For example, a user-generated computation may perform a mathematical calculation on certain data points. User-generated computations may also be configured to change a data format or replace data values. User-generated computations may also be configured to perform more complex operations, such as testing data points against a condition and, as a result, making changes to the data point or to other data points, or causing execution of another computation.

In an embodiment, execution management engine 110 includes execution component 112. Execution component 112 may be configured to receive the request to execute the process on a set of targets. In an embodiment, execution component 112 may be configured to identify the target data sets on which the process is to be executed. For example, execution component 112 may analyze the request to retrieve particular data set identifiers. For example, the request may indicate that the process is to be executed for all employees in a particular geography. Accordingly, execution component 112 may be configured to access data repository 118 and use a geography identifier as a search query to identify all employees that match the particular geography identifier.

As another example, execution component 112 may execute a process for refreshing an employee hierarchy. More specifically, employee changes (e.g., new arrivals, departing employees, etc.) may necessitate that an employee organizational chart or hierarchy be updated on a large scale. Execution component 112 may execute a process for employee hierarchy refresh by retrieving data for the affected employees from data repository 118, updating their hierarchy data (e.g., job levels, supervisor identifiers, subordinate identifiers, etc.), and outputting updated hierarchy data.

Execution component 112 may also be configured to further analyze characteristics of the request. For example, execution component 112 may determine a plurality of types of computations to be executed for completing the request. As mentioned above, the process may include multiple types of computations. Execution component 112 may be configured to analyze each computation and the affected target data sets. Based on this analysis, execution component 112 may be configured to generate one or more prediction values for the particular computation and/or the entire process that includes the computation. For example, execution component 112 can be configured to determine a predicted completion time for the computation and/or the process execution.

Alternatively or additionally, execution component 112 may be configured to analyze the request to determine a number of threads that will be used to execute the requested process. As used herein, threads can refer to computing resources that each process one or more subsets of the main process that is being executed. A thread may depend on the execution performed by another thread or may execute its portion of the process independently of other threads. Execution component 112 may be configured to evaluate the request to determine the type of process. The process may include one or more computations. Each computation may require one or more processing threads.

Execution component 112 may be configured to determine the optimal thread configuration for the process that will result in a successful or optimal process execution. For example, execution component 112 may be configured to identify the optimal thread configuration that results in the fastest process execution. Execution component 112 may be configured to identify the thread configuration with the greatest likelihood of successful process execution and/or recovery from common errors. Execution component 112 may be configured to identify a number of threads that result in optimal execution.

Similarly, execution component 112 may be configured to identify a thread activation scheme that results in optimal execution. For example, execution component 112 may analyze the request to determine each computation included in the requested process. Execution component 112 may determine that computation A within the process is likely to be more resource-intensive than computation B. As a result of this determination, execution component 112 may determine that computation A should execute first. Based on this analysis, execution component 112 may determine that all or a majority of available threads should be allocated to processing the execution of computation A. No threads or only a minority of threads may be allocated to processing the execution of computation B while computation A is still being executed.

Similarly, execution component 112 may determine that computation A needs no more than a certain number of threads to execute. In other words, there may be idle threads that can be assigned to computation B or some other computation. Execution component 112 may determine to override a user's allocation of threads for a particular process. For example, a user may recognize that computation A is resource-intensive and configure execution component 112 to allocate all available threads to computation A. However, execution component 112 may analyze the request and determine, as mentioned above, that computation A can use no more than a specific number of threads and that any excess threads will remain idle. Accordingly, execution component 112 may be configured to determine that an optimal execution requires that the idle threads not being used for computation A be allocated to some other computation (e.g., computation B). Execution component 112 may be configured to notify the user of this override action, or request approval from the user to override the user's thread allocation (e.g., through process execution interface 102).

In an embodiment, execution management engine 110 includes data update component 114. Data update component 114 may be configured to receive execution results from execution component 112 and update stored target data sets in data repository 118. For example, execution component 112 may have executed a process for refreshing an employee hierarchy, as described above. Data update component 114 may be configured to receive the updated hierarchy data and cause changes to data in data repository 118 resulting from the process execution. For example, data update component 114 may be configured to identify data points within data repository 118 that correspond to the updated data points generated from the process execution. Data update component 114 may be configured to replace the corresponding data values within data repository 118 based on the process execution. Data update component 114 may also be configured to cause process execution interface 102 to update its presentation of the process execution, via visualization component 116. In an embodiment, data update component 114 may be configured to transmit data changes occurring as a result of the process execution, in real time, to visualization component 116. In an embodiment, execution management engine 110 includes visualization component 116. Visualization component 116 may be configured to receive process execution results and cause process execution interface 102 to update its real-time visualization of the process execution.

In an embodiment, system 100 can include data repository 118. Data repository 118 may be configured to store one or more target data attributes 120. Target data attributes 120 may correspond to attributes or characteristics of a specific target on which the process will be executed. Continuing with the example of an employee in a large organization, a process execution target may be all or part of an employee data object. The employee data object may represent data in various formats that is stored across multiple data stores. The employee data object may represent or comprise multiple employee data attributes. For example, the employee data object may include employee data attributes such as business unit, country, department, job level, supervisor(s), subordinate(s), compensation structure attributes, compensation currency identifiers, experience level, or the like.

Alternatively or additionally, data repository 118 may be configured to store target statistics. Target statistics may correspond to statistics, records, or logs pertaining to previous process executions that impacted a particular target. Target statistics may also correspond to statistics or measures that are being generated in real time as some process is executed on a particular target. Target statistics can include, for example, metrics that were associated with a target before a particular process was executed with respect to the target. Target statistics can also include, for example, metrics that were associated with a target after a particular process was executed with respect to the target. Target statistics can include data regarding whether a particular process was successfully executed on the target, whether the target was generated as a result of a process execution, or the like. With respect to the example of an employee, target statistics may refer to a last updated date for the employee, a last hierarchy refresh date, a history of process executions on the employee, or the like.

Alternatively or additionally, data repository 118 may be configured to store execution data. Execution data can correspond to certain metrics or statistics generated as a result of one or more process executions. Execution data may be stored with reference to a particular process execution or type of process or may be aggregated across multiple process executions and/or types of processes. Execution data may include, for example, a number of successful executions of a particular process, a number of targets the process executed on, dates associated with each process execution, or the like. Particularly, execution data can include execution times for each process. Execution data may include, for each process execution, a predicted completion time and an actual completion time. Execution data can include metrics for currently executing processes, such as currently elapsed time, remaining time, predicted completion time, number of targets currently executed, number of targets remaining for execution, errors encountered within the execution, or the like. Execution data can also include error statistics for each process execution and each type of process.

In an embodiment, execution data can include statistics regarding computations that are part of a process execution. For example, execution data can include metrics on time taken for each computation to execute, average execution time, success rates for the execution of each computation, or the like. As described above, users may generate their own computations which may or may not have been tested on targets previously. Such user-generated computations may give rise to errors. Execution data can include error statistics and time statistics for each user-generated computation. These execution data can indicate to a user the feasibility of including a particular user-generated computation in a process execution.

In an embodiment, execution data can include statistics regarding processing threads that are used during an execution. As described above, threads can refer to computing resources that each process one or more subsets of the main process that is being executed. In some embodiments, execution component 112 may be configured to analyze the process execution request and determine an appropriate count of threads that should be used to execute the requested process. In other embodiments, a user may specify a number of available threads for executing the requested process. Execution data can include statistics indicating the performance of each process execution when executed using various thread configurations. For example, execution data can include metrics regarding elapsed time for a process execution when one count of threads was used versus when another count of threads was used to execute the same process.

In an embodiment, execution data can include particular models or patterns of optimal execution. These execution models may represent prior executions that satisfied one or more measures of optimality. For example, a particular execution model may represent the fastest known completion of a particular process execution. In an embodiment, each execution of the particular process may be compared (e.g., by execution component 112) to the particular execution model before the process is executed and a prediction may be issued indicating a degree to which the current process execution conforms to the model.

In an embodiment, execution data may also include analysis models that are used by system 100 (e.g., by execution component 112) to analyze the request and determine the request's conformity with different request categories. An analysis model may be used to identify request values in the request that correspond to request attributes associated with the request category. Additionally, analysis models may be used to identify patterns in the request that correspond to request types associated with the request category. Patterns that match those of prior executions of the current process type or of other processes may be used in generating a prediction with respect to the currently executing process (e.g., an amount of time the process is likely to take to complete).

In an embodiment, a data repository 118 is any type of storage unit and/or device (e.g., a file system, database, collection of tables, or any other storage mechanism) for storing data. Further, a data repository 118 may include multiple different storage units and/or devices. The multiple different storage units and/or devices may or may not be of the same type or located at the same physical site. Further, a data repository 118 may be implemented or may execute on the same computing system as one or more other components of the system 100. Alternatively or additionally, a data repository 118 may be implemented or executed on a computing system separate from one or more other components of the system 100. A data repository 118 may be communicatively coupled to one or more other components of the system 100 via a direct connection or via a network.

Information describing target attributes 120, target statistics 122, and execution data 124 may be implemented across any of components within the system 100. However, this information is illustrated within the data repository 118 for purposes of clarity and explanation.

In an embodiment, one or more components of the system 100 are implemented on one or more digital devices. The term "digital device" generally refers to any hardware device that includes a processor. A digital device may refer to a physical device executing an application or a virtual machine. Examples of digital devices include a computer, a tablet, a laptop, a desktop, a netbook, a server, a web server, a network policy server, a proxy server, a generic machine, a function-specific hardware device, a hardware router, a hardware switch, a hardware firewall, a hardware firewall, a hardware network address translator (NAT), a hardware load balancer, a mainframe, a television, a content receiver, a set-top box, a printer, a mobile handset, a smartphone, a personal digital assistant ("PDA"), a wireless receiver and/or transmitter, a base station, a communication management device, a router, a switch, a controller, an access point, and/or a client device.

Figure 1B:
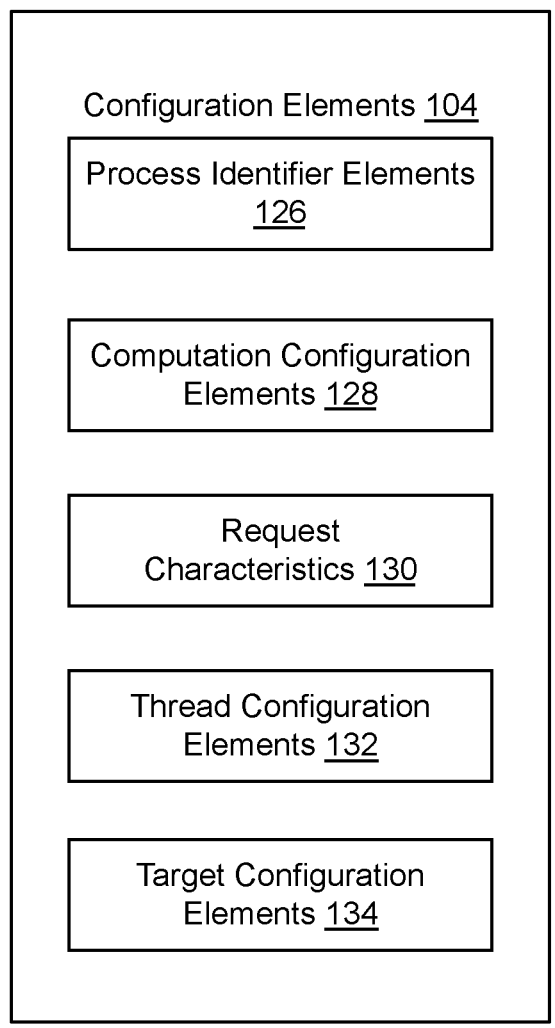

FIG. 1B illustrates details of a process execution interface in some embodiments. Particularly, FIG. 1B further illustrates configuration elements 104 the user can interact with to configure the request or the process to be executed as per the request. For example, the user can use configuration elements 104 to include particular types of computations as part of the process to be executed.

In an embodiment, configuration elements 104 can include process identifier elements 126. For example, a user can determine a type of process to execute. Process identifier elements 126 may enable a user to enter specific process identifiers (e.g., process ID, process name). Process identifier elements 126 may be used to select a previously executed process or a previous execution of a process (e.g., to re-execute the same process as previously executed). Process identifier elements 126 may include user interface elements to select multiple processes that satisfy particular criteria (e.g., a process type or time period that included certain process executions). Process identifier elements 126 can also include particular criteria selectors that correspond to one or more processes (e.g., a plan that includes multiple processes or a yearly cycle).

In an embodiment, configuration elements 104 can include computation configuration elements 128. As described above, computations may be predefined or may be user-generated. With regard to preset or predefined computations, computation configuration elements 128 may include computation selectors that enable a user to select one or more computations to add to a process to be executed. With respect to user-generated computations, computation configuration elements 128 may include elements that a user can use to generate a new computation, edit a previously created computation, or review details of user-generated computations.

In an embodiment, configuration elements 104 can include request characteristics 130. When a request is received by system 100, the request may include several request characteristics that define specific conditions, criteria, or settings related to the request. In the example of an employee hierarchy process, request characteristics 130 may include settings regarding, for example, whether to include specific employees (e.g., terminated employees) in the process execution, whether to reset employee data values set in the last process execution (e.g., manager hierarchy, currency conversion rates, eligibility criteria for certain benefits, etc.), and whether to update user interface settings (e.g., refresh predefined alerts, refresh column names, etc.). Request characteristics 130 may also pertain to other process-related settings. For example, request characteristics 130 may include whether to grant the process exclusive access to one or more resources (e.g., data files) while the process is active. Users may use the configuration elements within request characteristics 130 to set the abovementioned conditions. During process execution, some or all of these request characteristics 130 may display on a display screen. The presented request characteristics enable the user to see, at a glance, what settings were included within the user's original request.

In an embodiment, configuration elements 104 can include thread configuration elements 132. As described above, users may choose settings related to threads that will be used to execute some part of the process. Thread configuration elements 132 may be used to set the number of threads that will be used. Thread configuration elements 132 may also be used to create a particular thread configuration. For example, a user may allocate a first number of threads to a first computation in the process and a second number of threads to a second computation in the process. The user may create thread timing configurations. For example, the user may set that a first number of threads are activated at the beginning of a process execution, but at a certain point during the process, a second number of threads is activated as the process continues to execute. Additionally or alternatively, the user may instruct the system 100 to set the optimal thread configuration. In this embodiment, the system 100 analyzes the request and automatically selects the optimal thread configuration to use to execute the requested process.

In an embodiment, configuration elements 104 can include target configuration elements 134. Target configuration elements 134 may include configuration elements to select the particular targets on which the process will be executed. For example, a user may use target configuration elements 134 to select particular files, database tables, or any data sets on which the requested process is to be executed.

Figure 1C:
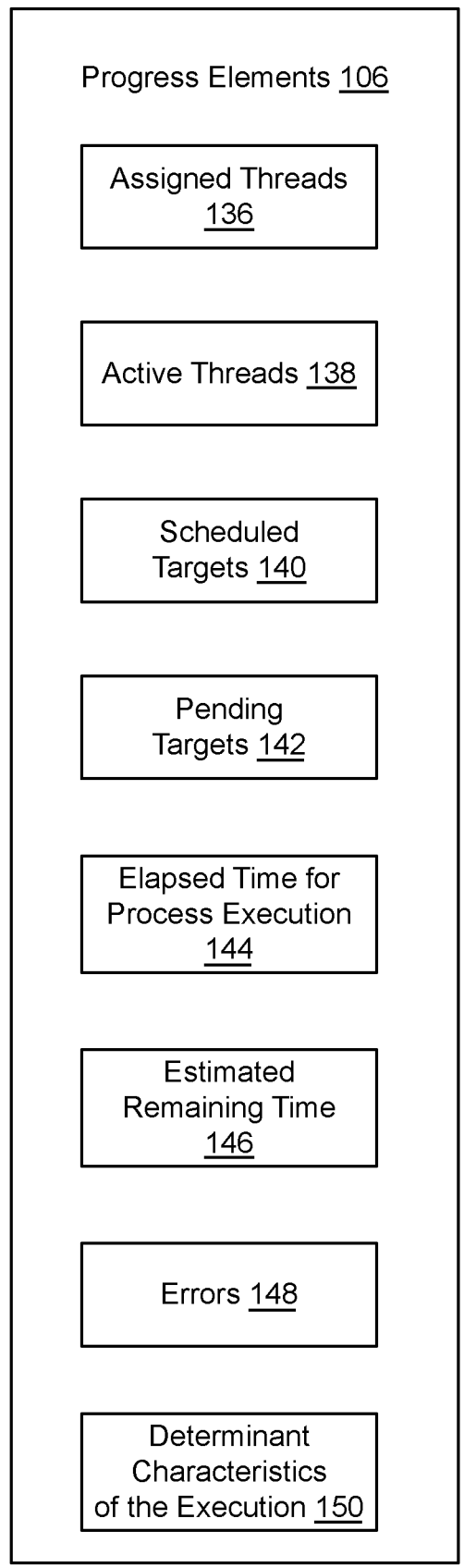

FIG. 1C illustrates details of a process execution interface in some embodiments. Particularly, FIG. 1C further illustrates progress elements 106 that include user interface elements that can present, to the user, one or more attributes or characteristics of the process execution as it is in progress. In an embodiment, progress elements 106 can include assigned threads 136. As mentioned above with respect to configuration elements 104, the threads assigned to the currently executing process may be configured automatically by the system 100 or by the user. The resulting thread configuration may be displayed via interface elements corresponding to assigned threads 136. These interface elements may show the number of assigned threads, the particular thread configuration, the originator of the thread configuration, or the like.

In an embodiment, progress elements 106 can include active threads 138. As described above with respect to configuration elements 104, the particular thread configuration may include various parameters such as the number of threads to be used and when certain numbers of threads may become activated. Accordingly, active threads 138 include interface elements that show, for example, the currently active number of threads executing the process. As the process executes, system 100 may be configured to update, in real time, active threads 138 to show the currently active number of threads.

In an embodiment, progress elements 106 can include interface elements representing scheduled targets 140. Scheduled targets 140 interface elements may include elements showing the number of targets to be processed during execution. Scheduled targets 140 may also include identifiers for the targets to be processed. For example, the data set, group of data points, or other identifiers may be displayed. In terms of the employee data example given above, the employee data group identifier (e.g., the employee database file, or the employee geography identifier, etc.) may be displayed on the display screen. As the process executes, the particular target that is currently processed may be displayed and as the process moves to the next target, the displayed target may be updated in real time. For example, while the process is executing on an employee, one or more employee identifiers may display. Once the employee is processed, the next employee's identifiers may display on the screen as the process executes on data for the next employee.

In an embodiment, progress elements 106 can include a number of pending targets 142. Pending targets 142 may include elements that display a number of pending targets and/or one or more identifiers for target data groupings that are yet to be processed. For example, where the process will be executed on a set of employees around the globe, the employee target data set may be distributed geographically (e.g., by country). While the process executes, pending targets 142 may include, for example, a list of geographical units that are yet to be processed. Pending targets 142 may include identifiers for the next employee, or the next geographical unit, or the next data file that is to be processed.

In an embodiment, progress elements 106 can include an elapsed time 144 for execution of the requested process. Elapsed time 144 may be calculated from the start of the process execution and may update, in real time, as the process executes. In an embodiment, elapsed time 144 may include elapsed times for each computation in the executing process. Elapsed time 144 may display the time taken by each thread during processing. Elapsed time 144 may also include interface elements that show a start time for each thread, how long each thread has executed, and when each thread completed processing or is projected to complete. In an embodiment, progress elements 106 can also include an estimated remaining time 146 for execution of the requested process.

In an embodiment, progress elements 106 can include one or more errors 148 that occur during the process execution. Errors 148 may include interface elements that present, in real time, details of any error that occurs. For example, errors 148 may include interface elements that indicate the error identifier, the affected target or targets, a timestamp associated with the error, any computation that was involved in causing the error, or the like. Errors 148 may also include interface elements that indicate whether the process can continue or not. If the process can continue, errors 148 may include interface elements that the user can interact with to continue the process or to stop the process from further execution. In an embodiment, system 100 may be configured to generate suggested changes that the user can make on-the-fly (in the middle of process execution) that can allow the process to correct the error and continue. For example, the error may have been caused because the process was configured to execute on inapplicable data, or one of request characteristics 130 may include conditions that prevent successful execution. System 100 may be configured to identify remediation measures, if possible, to correct the error to permit the process to continue execution.

In an embodiment, progress elements 106 can include one or more elements indicating determinant characteristics 150 of the process execution. Determinant characteristics 150 include one or more components of the process that system 100 (e.g., execution component 112) determines to be relatively more critical, dominant, or controlling parts of the process. For example, system 100 may analyze the request for process execution and identify that the requested process includes multiple computations. These computations involve a computation A that outputs certain results that are then used by a computation B, which in turn outputs results that are used by a computation C. Accordingly, system 100 may determine that the process includes at least one determinant characteristic because one or more computations rely on the result of a particular computation. Accordingly, the particular computation should be presented as determinant characteristics 150. System 100 may thus identify that computation A is a determinant or dominant component of the process to be executed. System 100 may present computation A using determinant characteristics 150. Highlighting this determinant characteristic in the interface elements of determinant characteristics 150 enables the user to see which portions of the process are more critical and thus deserving of the user's attention. For example, the user may wish to focus time and energy on ensuring that computation A is properly configured or coded, because other computations rely on correct results issuing from computation A.

As another example, system 100 may analyze the request and determine the component of the process to be executed that is likely to take the longest time. For example, system 100 may determine that there are two computations A and B within the process, and that computation A takes significantly longer than computation B to complete. Accordingly, system 100 may display computation A using interface elements for determinant characteristics 150. This may indicate to the user the portion of the requested process that takes the longest amount of time. In response, the user may wish to look for ways to reconfigure computation A to reduce its execution time.

Figure 1D:
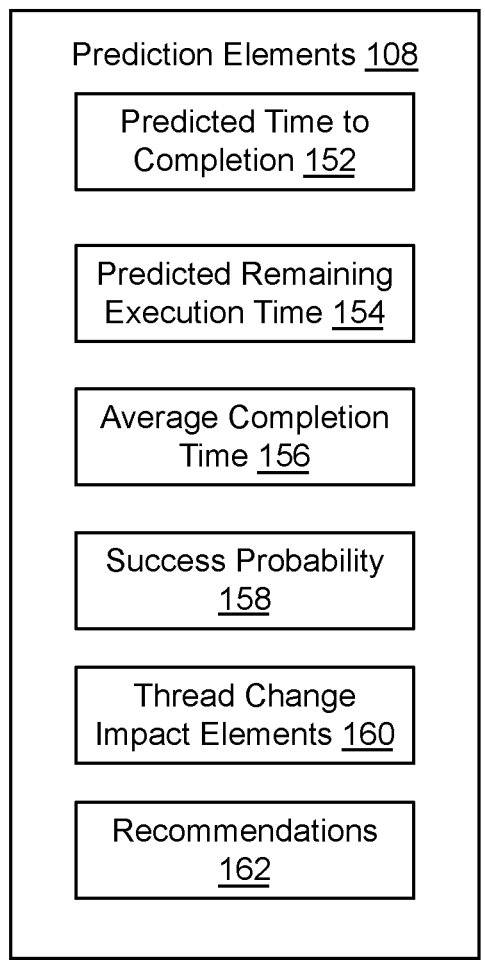

FIG. 1D illustrates details of a process execution interface in some embodiments. Particularly, FIG. 1D further illustrates prediction elements 108 that provide forecasts or predictions with respect to the process execution.

In an embodiment, prediction elements 108 can include a predicted time to completion 152. As described above, system 100 may be configured to analyze a request for process execution. This analysis may involve evaluating the targets to be processed, the computations included within the process that is requested, other request characteristics (e.g., particular request settings or conditions), the thread configuration associated with the request, or the like. Based on the above analysis, system 100 may be configured to compare the requested process to previously executed processes. System 100 may be configured to search for a prior execution that is the same as the currently requested process, or a prior execution that is similar to the currently requested process according to certain threshold similarity criteria. For example, system 100 may determine that the currently requested process is similar to another previous execution that processed the same or similar number of targets.

System 100 may be configured to identify one or more similar prior executions and identify the completion times for the prior executions. Based on the similarity analysis to the prior executions, system 100 may be configured to generate a predicted completion time for the currently requested process. Additionally, prediction elements 108 can include a predicted remaining execution time 154.

In an embodiment, prediction elements 108 can include an average completion time 156 for the currently executing process. Average completion time 156 may represent an average of past completion times for process executions for similar processes. Average completion time 156 may differ from predicted time to completion 152 because average completion time 156 may be a simple average of past completion times for the same or similar processes. By contrast, predicted time to completion 152 may be generated based on a more detailed analysis of components of the request, such as the thread configuration, number of targets, whether any targets have been processed previously using a similar process, the number of computations, number of preset versus user-generated computations, and request characteristics.

In an embodiment, prediction elements 108 can include a success probability prediction 158. System 100 may be configured to generate a success probability (e.g., as a percentage) indicating the probability that the process will complete successfully (e.g., with no errors, with only non-fatal errors, with less than a certain number of non-fatal errors, etc.). System 100 may be configured to analyze the requested process and compare it to prior similar process executions. Based on the comparison, system 100 may identify the number and type of errors that were encountered in past similar executions. System 100 may be configured to determine whether and how many of those previously encountered errors are likely to occur during execution of the currently requested process. System 100 may be configured to generate success probability 158 for the currently requested process, based on the determination.

In an embodiment, prediction elements 108 can include one or more user interface elements that express an execution impact of altering a thread configuration. These may be shown as thread change impact elements 160. For example, system 100 may receive a thread configuration in association with a request for process execution, as described above. The thread configuration may specify, for example, a number and sequence or firing order of threads for the process execution. System 100 may be configured to determine the impact of changing the thread configuration on the currently requested process. For example, system 100 may determine that adding one more thread to the execution may reduce the predicted completion time by 5%. Or the system 100 may determine that adding more threads may result in no change to completion time. System 100 may be configured to present these thread change impacts 160 to the user. This enables the user to determine whether the user is using the optimal thread configuration and what specific thread configuration changes may result in a better execution outcome.

In an embodiment, prediction elements 108 can include recommendation elements 162. As noted above, system 100 may be configured to determine the optimal thread configuration for a process execution. System 100 may determine that the thread configuration specified by the user may be improved through specific changes, such as increasing the number of allocated threads, allocating threads to different computations, or allocating threads in a different temporal order. Accordingly, system 100 may be configured to present specific recommendations to improve process execution.

In an embodiment, system 100 may present these recommendations before process execution, during process execution, or after the process execution is complete. For example, before process execution, system 100 may output, through recommendations 162, a message that states "Allocate more threads to computation A than computation B. Computation A is more resource-intensive", or a message that states "Add 3 more threads to your thread configuration to reduce completion time by 20%". Moreover, system 100 may be configured to anticipate certain errors before the point in execution at which they occur. System 100 may be configured to issue recommendations that enable a user to preempt errors determined through system 100's pre-analysis. For example, before or during execution, system 100 may issue recommendations, such as "computation D is likely to cause errors while executing on Targets 300-400. The following edits to computation D are recommended . . . ".

3. Process Execution Trend Prediction and Visualization

Figure 2A:
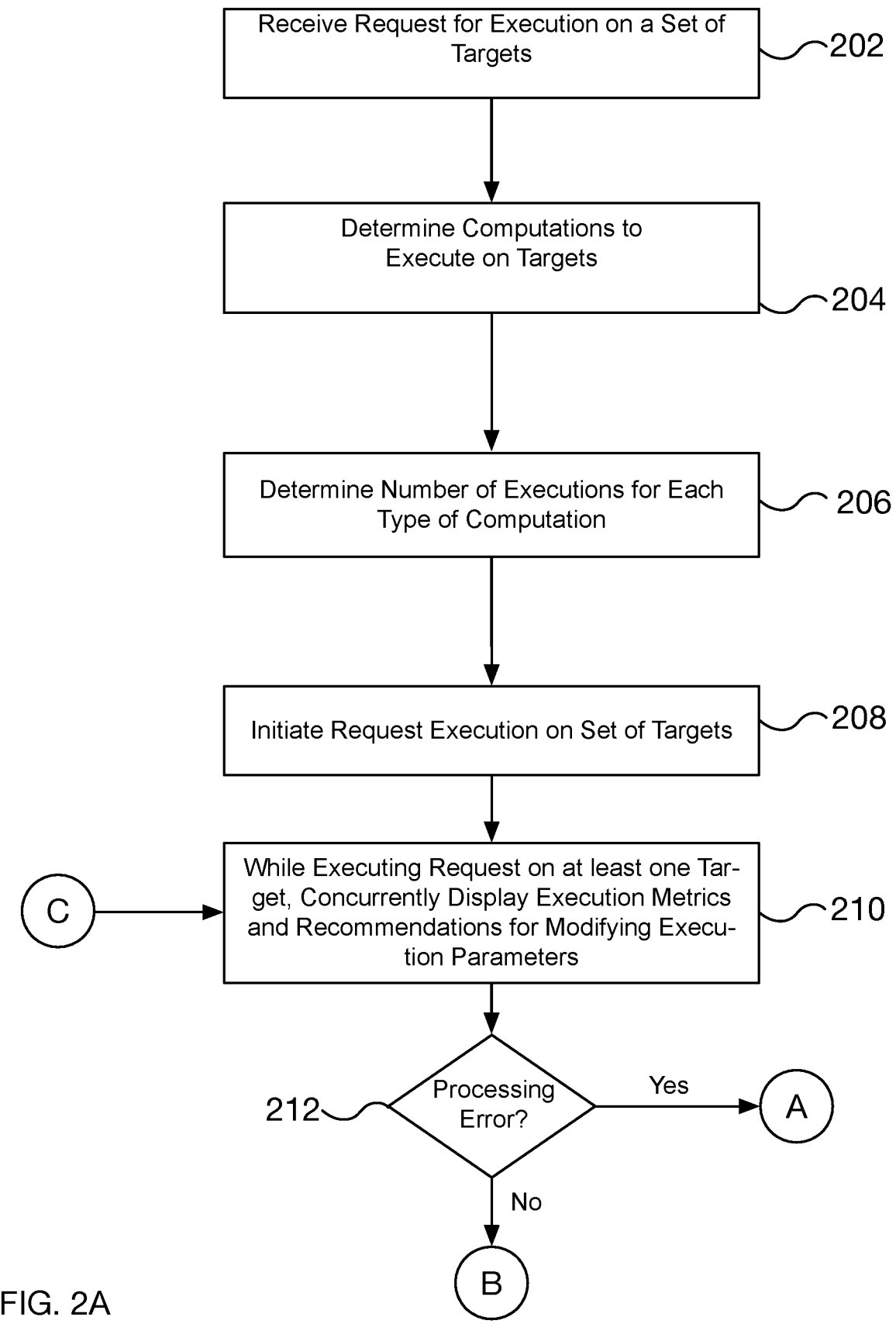
FIGS. 2A-2B illustrate a set of operations for process execution trend prediction and visualization in accordance with one or more embodiments.
Figure 2B:
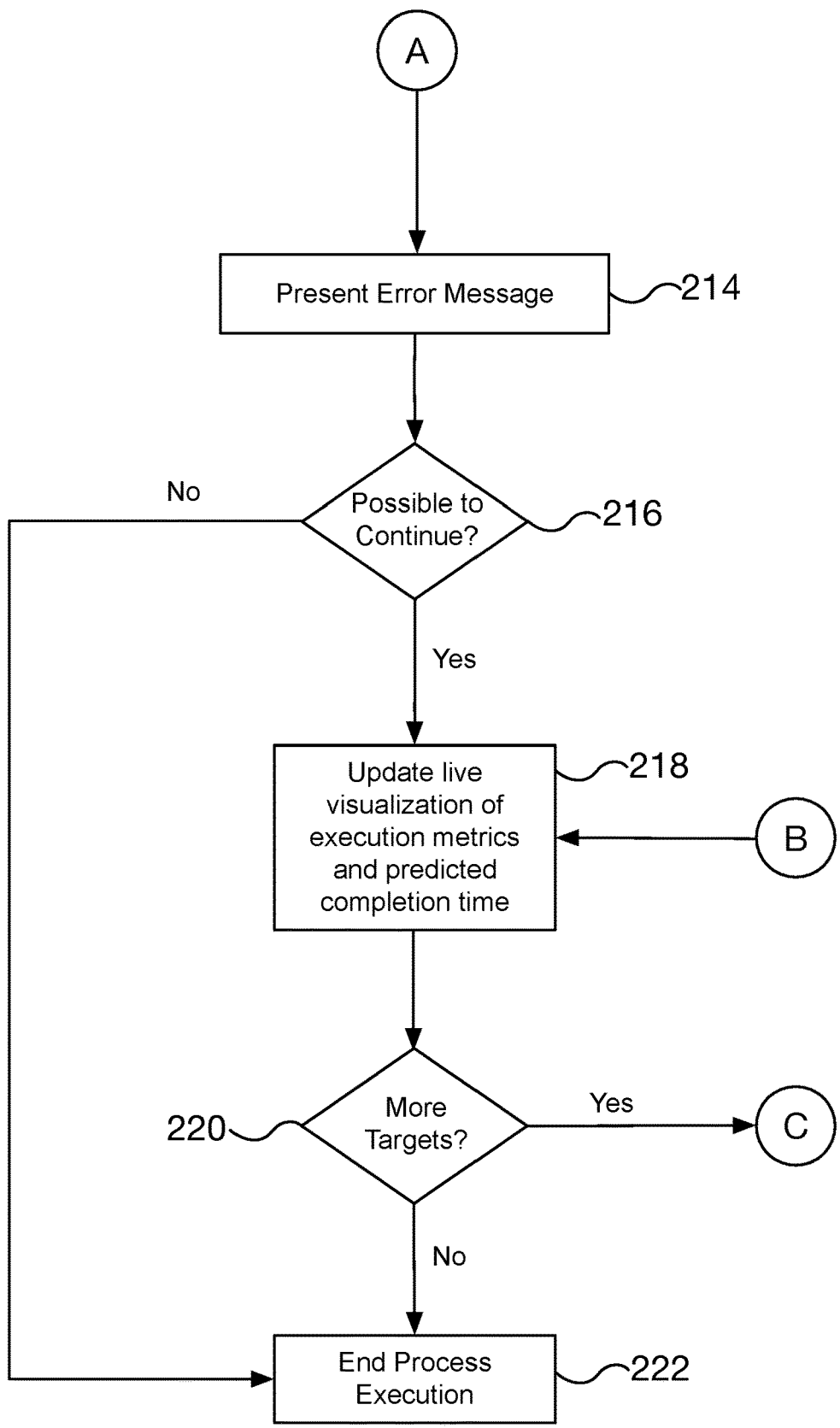

FIGS. 2A-2B illustrate an example set of operations for process execution trend prediction and visualization in accordance with one or more embodiments. One or more operations illustrated in FIGS. 2A-2B may be modified, rearranged, or omitted all together. Accordingly, the particular sequence of operations illustrated in FIGS. 2A-2B should not be construed as limiting the scope of one or more embodiments. As an example, execution management engine 110 (shown in FIG. 1) may be configured to perform one or more operations of the process of FIGS. 2A-2B.

In an embodiment, execution management engine 110 receives a request for execution on a set of targets (Operation 202). As discussed above, the request may include various request parameters, such as one or more computations, the targets to be processed, particular thread configurations, one or more request characteristics (e.g., settings, conditions, or other criteria), and the like. Execution management engine 110 may be configured to analyze the request to identify what targets are to be processed and retrieve those targets from, for example, data repository 118.

In an embodiment, execution management engine 110 analyzes the computations included within the requested process that are to be executed on the identified targets (Operation 204). For example, the execution management engine 110 may determine that the request includes a set of preset computations and/or a set of user-generated computations. Execution management engine 110 may be configured to preemptively analyze each computation to determine whether it is applicable to the set of targets identified in the request. For example, execution management engine 110 may check one or more components of each computation (e.g., software code components such as objects, classes, variables, imported code files, etc.) to check whether these components correspond to the identified targets.

In an embodiment, execution management engine 110 may be configured to execute each computation on a small subset of targets (e.g., a single target or a set of edge cases such as a highest possible value and a lowest possible value for a target data parameter) before initiating the full process execution as a unit test. As another part of the preemptive analysis, execution management engine 110 may be configured to evaluate whether the provided computations have ever been executed before. For example, execution management engine 110 may compare a user-generated computation with previously executed user-generated computations to determine whether the current user-generated computation has been executed before. A prior successful (e.g., error-free) execution of a user-generated computation may indicate that it is likely to succeed during the current process execution.

In an embodiment, execution management engine 110 determines a number of executions that are to be performed for each type of computation (Operation 206). For example, execution management engine 110 analyzes the target data set identified by the request and determines the targets that will be processed by each computation in the data set. Of course, certain targets may undergo processing by multiple computations. Based on this determination, execution management engine 110 determines measures representing the volume or count of the executions in the process. Execution management engine 110 may be configured to include these measures in its predictions such as predicted completion time, success probability, or the like, as described above with respect to FIG. 1D.

Moreover, in some embodiments, execution management engine 110 may compare these measures of execution (e.g., execution counts) to available computing resources (e.g., available threads, available processor time, clock speeds, memory capacity, storage capacity, network bandwidth, power capacity, etc.). In an embodiment, execution management engine 110 may determine that the number of executions can be handled by the available computing resources. If execution management engine 110 that the volume of executions requested exceeds the available computing resources in one or more ways, execution management engine 110 may be configured to notify the user of this and terminate process execution until the requested process is modified or more resources become available.

Additionally or alternatively, execution management engine 110 may be configured to generate a predicted completion time for the process and determine whether it exceeds a reasonable threshold. For example, a user may tolerate a certain amount of processing time (e.g., 30 minutes, 1 hour, 1 day, etc.) before the process completes successfully or unsuccessfully. The user may wish to know whether the process will complete, even if unsuccessfully, within a reasonable amount of time so that the user can decide whether to even execute the process as currently configured. Accordingly, execution management engine 110 may determine that the projected process execution will, even if successfully completed, take a period of time that exceeds a threshold. As a result, execution management engine 110 may decline to execute the process and notify the user accordingly.

In an embodiment, execution management engine 110 may determine that the requested process meets one or more criteria for initiating execution. For example, execution management engine 110 may determine that the requested process a) includes valid computations that are likely to execute on all applicable targets successfully, b) will complete in within a threshold amount of time, and/or c) has an overall success probability that exceeds a certain probability threshold. When one or more initiation criteria are met, execution management engine 110 may be configured to initiate process execution on a set of targets (Operation 208). As the process execution is initiated, execution management engine 110 executes the process on each identified target. In an embodiment, execution management engine 110 may be configured with one or more execution configurations that determine the sequence in which the executions are to proceed. For example, there may be scenarios where multiple computations must execute on the same target or individual data point of a target. Execution management engine 110 may analyze each of the applicable computations to determine a sequence in which each computation should be performed on the target so that the process can execute successfully.

As targets are processed, execution management engine 110 concurrently displays one or more execution metrics and recommendations for modifying one or more execution parameters. (Operation 210). As described above, execution management engine 110 may cause process execution interface 102 to present a dynamically updating visualization of the process execution. As described above with respect to FIGS. 1B-1D, process execution interface 102 may present one or more configuration elements, progress elements, prediction elements, or some combination of the above. In an embodiment, process execution interface 102 may present execution metrics such as those displayed in FIG. 3. For example, process execution interface 102 may present process identifiers, a number of targets processed and still remaining, a number of computations and sub-processes that have been processed and those that are pending processing.

In some embodiments, execution management engine 110 may cause process execution interface 102 to display one or more execution metrics. For example, process execution interface 102 may display a number of targets scheduled for processing, a number of targets that have been processed, and a number of pending targets. Process execution interface 102 may display a number of scheduled or predicted operations to be performed. For example, two computations that each must operate on five targets will result in a total of ten computation operations. Similarly, process execution interface 102 may display a number of completed operations, and a number of remaining operations.

Moreover, execution management engine 110 may cause process execution interface 102 to display one or more thread metrics for threads that are being used to execute the process. For example, process execution interface 102 may display a number of threads that are assigned to the process execution. Process execution interface 102 may present one or more identifiers for the applicable thread configuration, if any. Process execution interface 102 may present a number of threads are currently active in executing the requested process.

Additionally or alternatively, execution management engine 110 may be configured to cause process execution interface 102 to present prediction elements such as a recommendation on whether the thread configuration should be altered to ensure optimal process execution. In an embodiment, execution management engine 110 may be configured to review the active process execution, in real time, and determine whether a better process execution can be carried out. For example, execution management engine 110 may determine, while the process is executing, based on the current states of one or more target data points, a superior thread configuration compared to the one that is currently applied to the process execution. Accordingly, execution management engine 110 may cause process execution interface 102 to present a recommendation of the newly identified thread configuration to the user.

In the course of the process execution, execution management engine 110 may encounter processing errors (Operation 212). Errors may arise from a variety of sources including, but not limited to, incorrectly configured computations, data access issues (e.g., lack of security access or permissions to target data), network connectivity issues, or the like. In an embodiment, execution management engine 110 causes process execution interface 102 to present each processing error as it occurs. (Operation 214). If execution management engine 110 does not encounter a processing error with respect to a target, execution management 110 may be configured to move to Operation 218. In an embodiment, Operation 218 involves execution management engine 110 updating the dynamically updating visualization with, for example, updated execution metrics and a predicted completion time.

In an embodiment, execution management engine 110 may be configured to determine whether it is possible to continue executing the process if an error is encountered (Operation 216). Execution management engine 110 determines whether the current error will require that the process be stopped. For example, execution management engine 110 may be configured to identify a computation that was active at the time the error occurred. Execution management engine 110 may determine whether the computation can continue on to the next target without affecting another part of the process, such as another computation that may rely on the results of the first computation. Execution management engine 110 may determine whether the target that was being executed on at the time of the error is a target that must have a correct value or correct data state for the remainder of the process to continue executing successfully. If execution management engine 110 determines that the process should not continue execution, execution management engine 110 moves to Operation 222 and ends the process execution.

Conversely, where execution management engine 110 determines that execution can continue, execution management engine 110 continues to update the visualization with, for example, execution metrics, thread metrics, and/or other applicable aspects of the process execution (Operation 218). As each target is processed, execution management engine 110 may determine whether more targets still remain to be processed. (Operation 220). Where more targets are still to be processed, execution management engine 110 reverts to Operation 210 and displays execution metrics, thread status, recommendations, and other aspects of the process execution. However, where execution management engine 110 determines that all targets have been processed, execution management engine 110 ends process execution (Operation 222).

4. Illustrative Example

A detailed example is described below for purposes of clarity. Components and/or operations described below should be understood as one specific example which may not be applicable to certain embodiments. Accordingly, components and/or operations described below should not be construed as limiting the scope of any of the claims.

Figure 3:
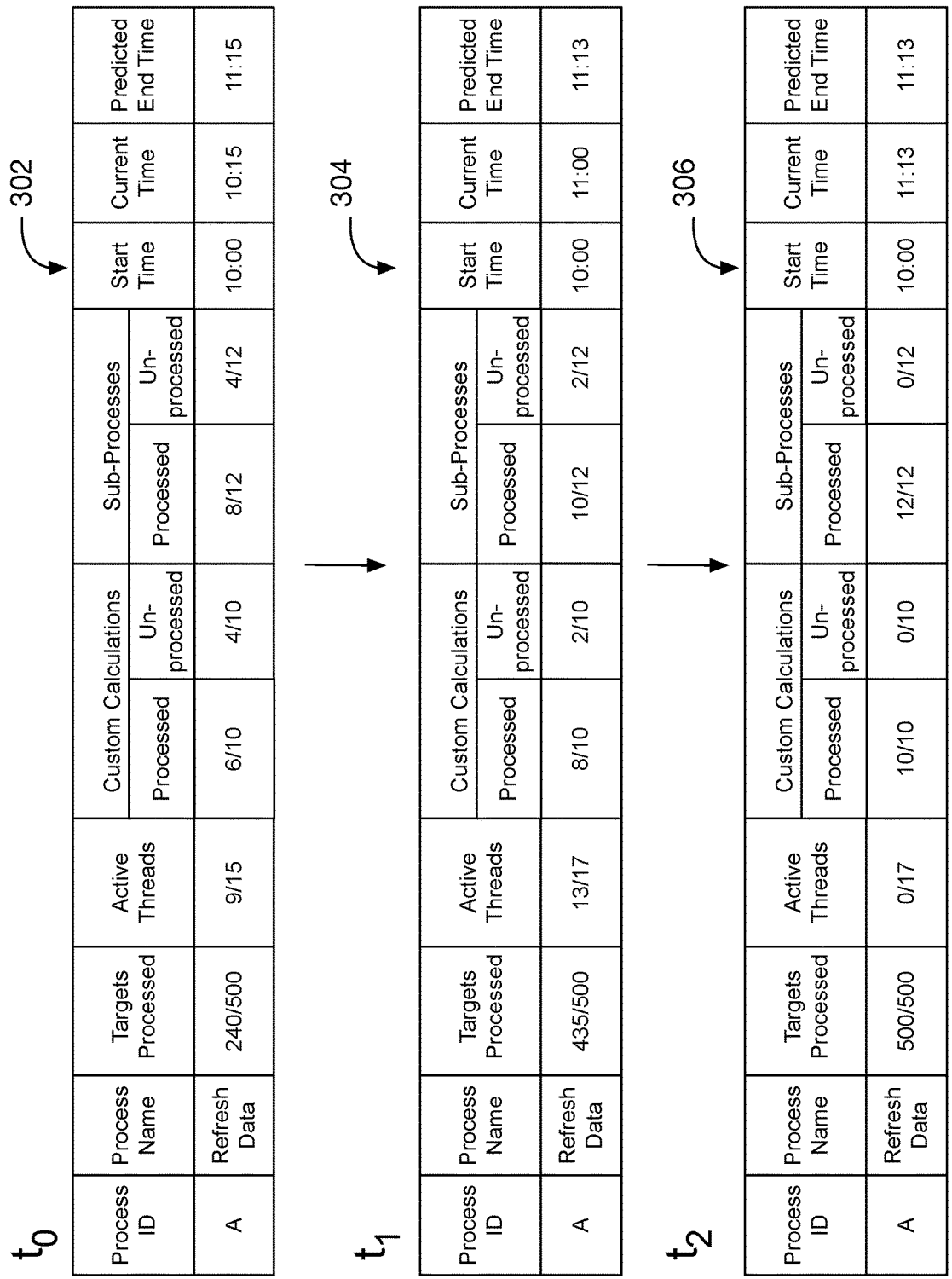
FIG. 3 illustrates an example visualization of a process execution in accordance with one or more embodiments.

FIG. 3 shows an illustrative example of a dynamically updating visualization generated according to the disclosed embodiments. For example, the visualization may be generated by execution management engine 110 and presented via process execution interface 102. FIG. 3 shows the visualization at three different points in time.

FIG. 3 shows visualization state 302. In an embodiment, state 302 shows a visualization of the process execution at time to. As shown, state 302 shows one or more visualization elements, such as one or more of progress elements 106 and/or prediction elements 108. In an embodiment, state 302 shows the following elements:
Process ID: A
Process Name: Refresh Workforce Data
Targets Processed 240/500
Active Threads: 9/15
Custom Calculations (Processed): 6/10
Custom Calculations (Un-processed): 4/10
Sub-Processes (Processed): 8/12
Sub-Processes (Un-processed): 4/12
Process Start Time: 10:00:00
Current Time: 10:15:00
Predicted End Time: 11:15:00

In particular, state 302 shows at least two different types of computations and respective metrics regarding how many computations of each type are processed or remain unprocessed. Computations may execute on a per target basis or may execute per computation for the entire set of targets. As shown in state 302, "custom calculations" refers to custom computations that are created by a user that has, for example, purchased or licensed software that can display the states shown in FIG. 3. For example, the user may create various custom algorithms, software packages, scripts, applets, or other coded routines that cause changes to target data. "Sub-processes" refer to similar but preset computations that have been packaged with the software and can be selected and included within any process execution. As shown in FIG. 3, process execution interface 102 updates the display of processed and unprocessed computations for each type of computation.

As more targets are processed, process execution interface 102 updates the display of, for example, "Targets Processed" in real time. For example, state 304 shows that the number of targets processed has been updated to 435/500. State 302 also shows a Predicted End Time of 11:15:00. As discussed above, execution management engine 110 may be configured to cause process execution interface 102 to present a predicted completion time for the requested process. The prediction may be generated, for example, by analyzing past executions of the same or similar processes, by preemptively executing subsets of the requested process, and/or by analyzing statistical values associated with prior executions.

In an embodiment, process execution interface 102 updates, in real time, the display of the predicted completion time or other prediction elements. For example, as shown in state 304, the Predicted End Time is now shown to be 11:13:00 instead of 11:15:00. Execution management engine 110 may be configured to reevaluate the process as it is executing to provide increasingly more accurate predictions. For example, execution management engine 110 may be configured to monitor all active executions. Execution management engine 110 may identify that another process execution has completed. As a result, additional computing resources, such as processing threads, are now available to be used for the process execution depicted in FIG. 3. Accordingly, execution management engine 110 may dynamically allocate additional threads to the currently executing process. For example, state 304 shows that now 17 threads are available to execute the requested process, rather than the initial 15. In another embodiment (not shown), execution management engine 110 may be configured to present a recommendation to add additional thread resources or update the assigned thread configuration for the requested process in order to attain an optimal process execution. State 306 shows that all targets have been processed and all computations including within the process have completed operation.

Figure 4:
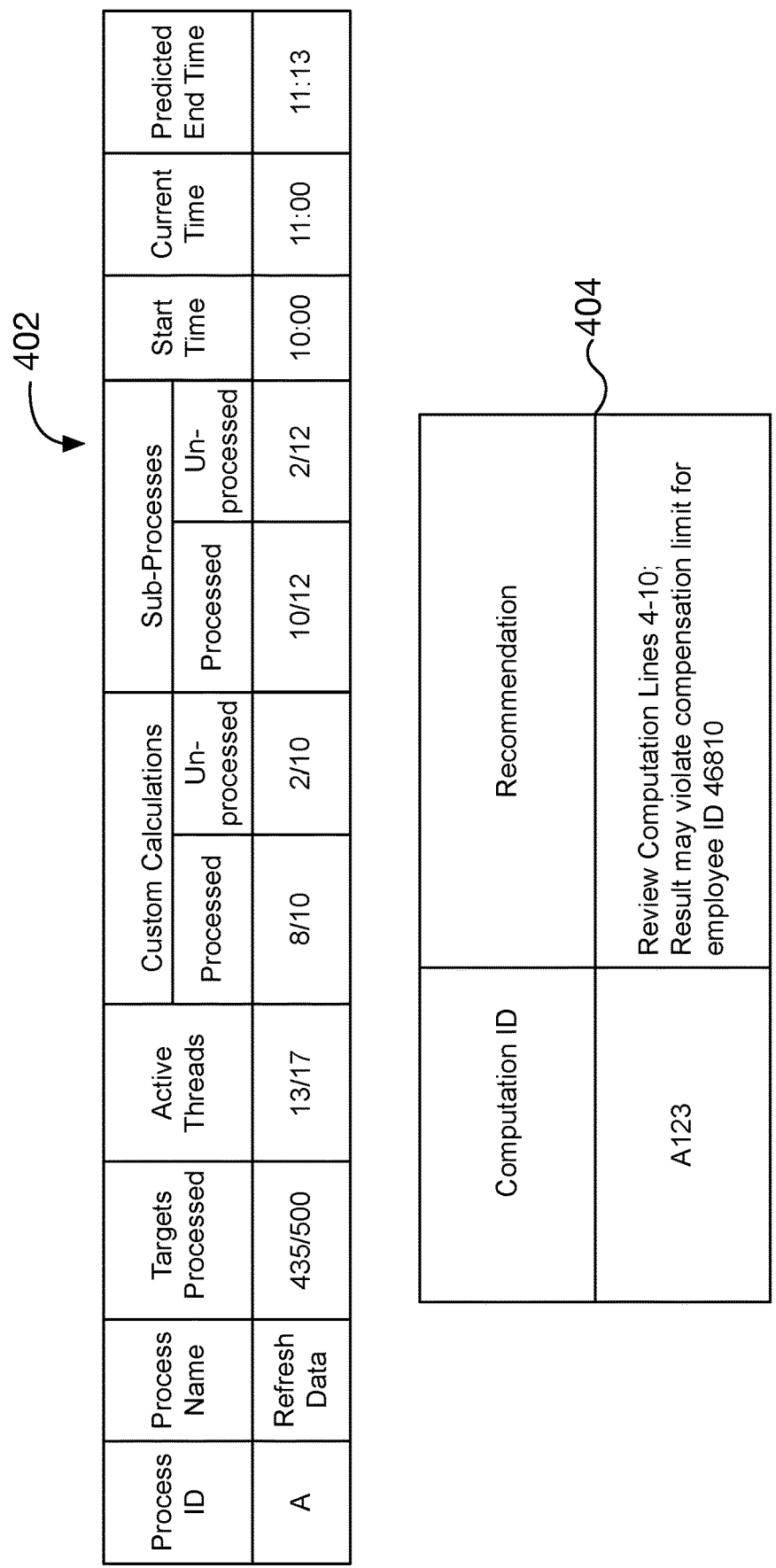
FIG. 4 shows an example visualization of an action recommendation that is provided during process visualization in response to an error.

FIG. 4 shows an example visualization of a recommendation that is provided during process visualization. As shown, state 402 shows one or more interface elements for a currently executing process. During execution, execution management engine 110 reviews aspects of the execution (e.g., active computations) and determines whether the execution can be optimized in one or more ways.

As shown, execution management engine 110 presents notification element 404 during execution at time 11:00:00. Notification element 404 identifies a computation ID A123. Notification element 404 also shows a recommendation indicating that the user should "Review Computation Lines 4-10" because "Result may violate compensation limit for employee 46810". In the illustrated embodiment, execution management engine 110 evaluates the currently active computation and determines that some part of the computation would likely violate a rule (e.g., a global compensation limit for an employee or a category of employees). Accordingly, execution management engine 110 identifies the relevant computation or section thereof and highlights the potential upcoming problem with the computation before it occurs.

In another embodiment (not shown), execution management engine 110 may be configured to present the error that may result once it does occur. For example, the misconfiguration in lines 4-10 of computation A123 may eventually violate a global compensation rule once it processes the target employee 46810. The rule violation may cause an error (e.g., another part of the process execution may throw an exception). The error is presented using notification element 404.

Figure 5:
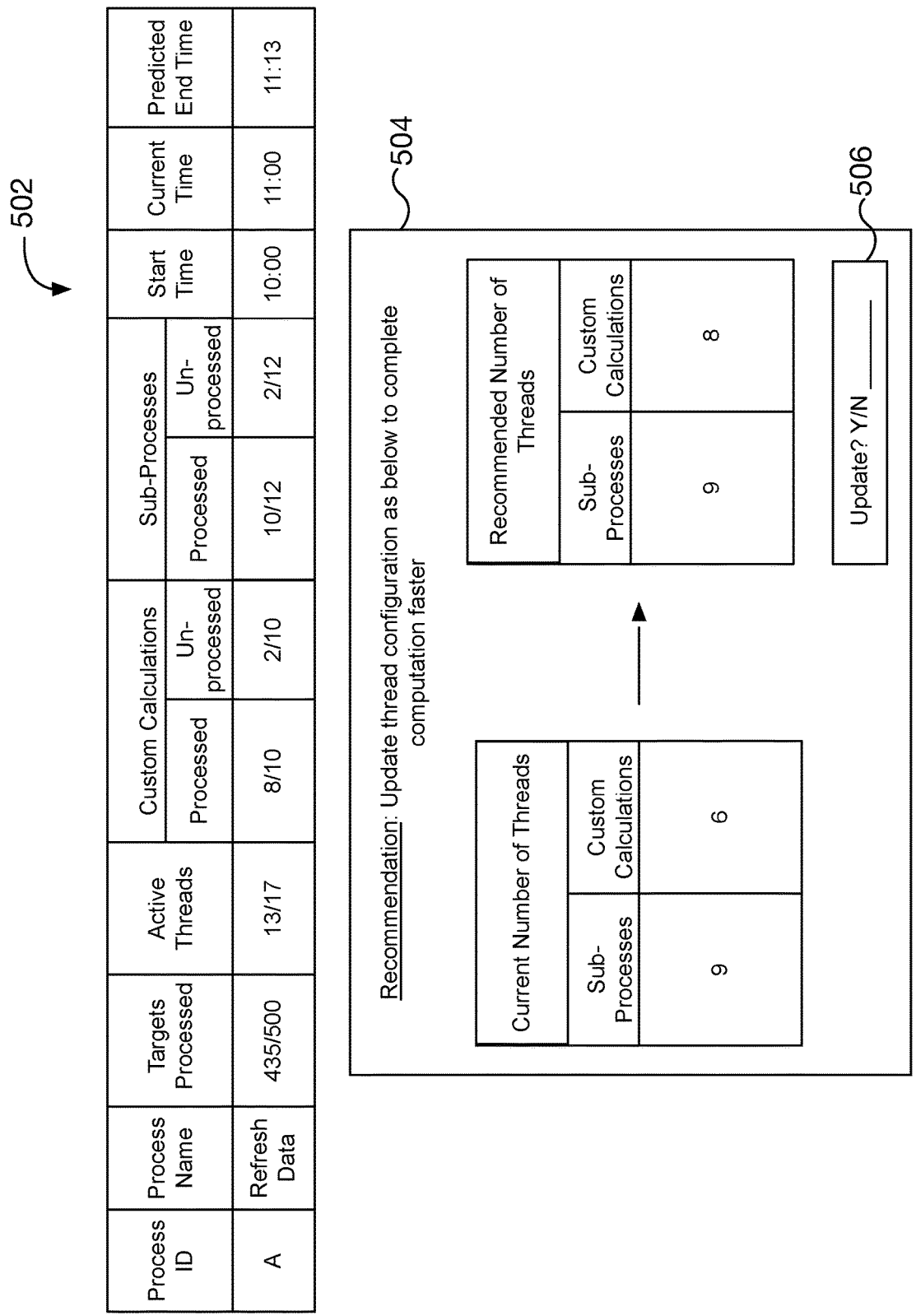
FIG. 5 shows an example visualization of an action recommendation that is provided during process visualization to recommend a thread configuration change.

FIG. 5 shows an example visualization of a thread update recommendation that is provided during process visualization. As shown, state 502 shows one or more interface elements for a currently executing process. As described above with respect to FIG. 4, execution management engine 110 reviews aspects of the execution (e.g., active computations) and determines whether the execution can be optimized in one or more ways. For example, execution management engine 110 continuously evaluates the process to determine whether an optimal thread configuration is in effect. As shown, execution management engine 110 presents notification element 504 during execution at time 10:50:00. Notification element 504 identifies a computation ID F498. Notification element 504 also shows a recommendation indicating that the user should "Update thread configuration as below to complete computation faster". Notification 504 also shows a current number of threads assigned to different types of computations. For example, notification element 504 shows a current number of threads for a first type of computations (sub-processes) to be 9 and a number of threads for a second type of computation (custom calculations) to be 6.

Notification element 504 also shows a recommended number of threads for the first type of computations (sub-processes) to be 9 and a number of threads for the second type of computation (custom calculations) to be 8. In other words, execution management engine 110 has determined that a type of computations (custom calculations) should be assigned two more threads to achieve an optimal thread configuration. In another embodiment (not shown) notification element 504 may be configured to show a thread configuration recommendation to update the thread configuration for a single computation, for the whole process, for a certain period of time, or for a certain target or type of targets. Notification 504 also includes a notification control 506. In an embodiment, the user can interact with control 506 to update the thread configuration for the process execution.

In another embodiment (not shown), execution management engine 110 may be configured to dynamically update the visualization as the user adds more threads to the process execution. Moreover, execution management engine 110 may be configured to provide a preview of the effect of adding each thread to the process execution before the thread is added.

5. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

6. Hardware Overview

According to one embodiment, the techniques described herein are implemented by one or more special-purpose computing devices (i.e., computing devices specially configured to perform certain functionality). The special-purpose computing devices may be hard-wired to perform the techniques, or may include digital electronic devices such as one or more application-specific integrated circuits (ASICs), field programmable gate arrays (FPGAs), or network processing units (NPUs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, FPGAs, or NPUs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a liquid crystal display (LCD), plasma display, electronic ink display, cathode ray tube (CRT)

monitor, or any other kind of device for displaying information to a computer user. An input device 614, including alphanumeric and other keys, may be coupled to bus 602 for communicating information and command selections to processor 604. Alternatively or in addition, the computer system 600 may receive user input via a cursor control 616, such as a mouse, a trackball, a trackpad, a touchscreen, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane. The display 612 may be configured to receive user input via one or more pressure-sensitive sensors, multi-touch sensors, and/or gesture sensors. Alternatively or in addition, the computer system 600 may receive user input via a microphone, video camera, and/or some other kind of user input device (not shown).

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a programmable read-only memory (PROM), and erasable PROM (EPROM), a FLASH-EPROM, non-volatile random-access memory (NVRAM), any other memory chip or cartridge, content-addressable memory (CAM), and ternary content-addressable memory (TCAM).

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a network, via a network interface controller (NIC), such as an Ethernet controller or Wi-Fi controller. A NIC local to computer system 600 can receive the data from the network and place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the worldwide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. One or more non-transitory computer readable media comprising instructions which, when executed by one or more hardware processors, cause performance of operations comprising:
   receiving a request to be executed on a set of targets;
   analyzing a set of one or more characteristics of the request to determine a plurality of types of computations to be executed for completing the request;
   initiating execution of the request on the set of targets;

concurrently with executing the request, displaying:
a first number of threads currently executing computations of the request that are of a first type of computation, wherein the display of the first number of threads is continuously or periodically updated during execution of the request; and
a second number of threads currently executing computations of the request that are of a second type of computation, wherein the display of the second number of threads is continuously or periodically updated during execution of the request;
estimating (a) a first performance improvement of configuring an additional thread for processing executions of the first type of computation and (b) a second performance improvement of configuring the additional thread for processing executions of the second type of computation; and
based on the first performance improvement and the second performance improvement, recommending the additional thread for processing executions of the first type of computation without recommending the additional thread for processing executions of the second type of computation.

2. The media of claim 1, wherein the operations further comprise:
concurrently with executing the request, further displaying:
a first number of the computations of the first type of computation that have to be executed for completing the request; and
a second number of the computations of the first type of computation that have to be executed for completing the request.

3. The media of claim 1, wherein the operations further comprise:
estimating an amount of time for an execution of first type of computation based on the first number of threads;
based at least on the estimated amount of time for the execution of the first type of computation, determining and displaying one or more of:
a predicted total amount of time for completing the request;
a predicted remaining amount of time for completing the request;
a predicted average amount of time for completing the request for a single target of the set of targets.

4. The media of claim 1, wherein the operations further comprise:
estimating an amount of time for an execution of first type of computation based on the set of one or more characteristics of the request;
based at least on the estimated amount of time for the execution of the first type of computation, determining and displaying one or more of:
a predicted total amount of time for completing the request;
a predicted remaining amount of time for completing the request;
a predicted average amount of time for completing the request for a single target of the set of targets.

5. The media of claim 1, wherein the operations further comprise:
determining that the request has been previously executed on a first subset of targets of the set of targets and not been executed on a second subset of targets of the set of targets; and
initiating execution of the request on the second subset of targets.

6. The media of claim 1, wherein the operations further comprise:
estimating a time for executing the request on a first target of the set of targets based on a prior execution of the request on the first target.

7. The media of claim 1, wherein the operations further comprise:
identifying an error with execution of at least one computation, of said computations, in association with a particular target of the set of targets;
concurrently with executing the request, further displaying information identifying the error and the particular target.

8. The media of claim 1, wherein the operations further comprise:
concurrently with executing the request, displaying and continuously updating one or more of:
a number of targets fully processed in accordance with the request;
a number of targets still to-be-processed in accordance with the request;
a number of computations of the first type completed in accordance with the request;
a number of computations of the first type still to-be-completed in accordance with the request.

9. The media of claim 1, wherein the operations further comprise:
analyzing the set of one or more types of computations according to at least one statistical threshold;
based on the analyzing operation, recommending a particular type of computation of the plurality of types of computations for optimization.

10. A system comprising:
at least one device including a hardware processor;
the system being configured to perform operations comprising:
receiving a request to be executed on a set of targets;
analyzing a set of one or more characteristics of the request to determine a plurality of types of computations to be executed for completing the request;
initiating execution of the request on the set of targets;
concurrently with executing the request, displaying:
a first number of threads currently executing computations of the request that are of a first type of computation, wherein the display of the first number of threads is continuously or periodically updated during execution of the request; and
a second number of threads currently executing computations of the request that are of a second type of computation, wherein the display of the second number of threads is continuously or periodically updated during execution of the request;
estimating (a) a first performance improvement of configuring an additional thread for processing executions of the first type of computation and (b) a second performance improvement of configuring the additional thread for processing executions of the second type of computation; and
based on the first performance improvement and the second performance improvement, recommending the additional thread for processing executions of the first type of computation without recommending the additional thread for processing executions of the second type of computation.

11. The system of claim 10, wherein the operations further comprise:
concurrently with executing the request, further displaying:
a first number of the computations of the first type of computation that have to be executed for completing the request; and
a second number of the computations of the first type of computation that have to be executed for completing the request.

12. The system of claim 10, wherein the operations further comprise:
estimating an amount of time for an execution of first type of computation based on the first number of threads;
based at least on the estimated amount of time for the execution of the first type of computation, determining and displaying one or more of:
a predicted total amount of time for completing the request;
a predicted remaining amount of time for completing the request;
a predicted average amount of time for completing the request for a single target of the set of targets.

13. The system of claim 10, wherein the operations further comprise:
estimating an amount of time for an execution of first type of computation based on the set of one or more characteristics of the request;
based at least on the estimated amount of time for the execution of the first type of computation, determining and displaying one or more of:
a predicted total amount of time for completing the request;
a predicted remaining amount of time for completing the request;
a predicted average amount of time for completing the request for a single target of the set of targets.

14. The system of claim 10, wherein the operations further comprise:
concurrently with executing the request, displaying and continuously updating one or more of:
a number of targets fully processed in accordance with the request;
a number of targets still to-be-processed in accordance with the request;
a number of computations of the first type completed in accordance with the request;
a number of computations of the first type still to-be-completed in accordance with the request.

15. The system of claim 10, wherein the operations further comprise:
analyzing the set of one or more types of computations according to at least one statistical threshold;
based on the analyzing operation, recommending a particular type of computation of the plurality of types of computations for optimization.

16. A method comprising:
receiving a request to be executed on a set of targets;
analyzing a set of one or more characteristics of the request to determine a plurality of types of computations to be executed for completing the request;
initiating execution of the request on the set of targets;
concurrently with executing the request, displaying:
a first number of threads currently executing computations of the request that are of a first type of computation, wherein the display of the first number of threads is continuously or periodically updated during execution of the request; and
a second number of threads currently executing computations of the request that are of a second type of computation, wherein the display of the second number of threads is continuously or periodically updated during execution of the request;
estimating (a) a first performance improvement of configuring an additional thread for processing executions of the first type of computation and (b) a second performance improvement of configuring the additional thread for processing executions of the second type of computation; and
based on the first performance improvement and the second performance improvement, recommending the additional thread for processing executions of the first type of computation without recommending the additional thread for processing executions of the second type of computation.

17. The method of claim 16, further comprising
estimating an amount of time for an execution of first type of computation based on the first number of threads;
based at least on the estimated amount of time for the execution of the first type of computation, determining and displaying one or more of:
a predicted total amount of time for completing the request;
a predicted remaining amount of time for completing the request;
a predicted average amount of time for completing the request for a single target of the set of targets.

18. The media of claim 1, wherein the first number of threads comprise computing resources that execute at least a portion of a process.

19. The system of claim 10, wherein the first number of threads comprise computing resources that execute at least a portion of a process.

20. The method of claim 16, wherein the first number of threads comprise computing resources that execute at least a portion of a process.

* * * * *